United States Patent

Piacentino

[15] 3,704,752
[45] Dec. 5, 1972

[54] APPARATUS FOR WORKING THE COMPOST OF MUSHROOM BEDS

[72] Inventor: Thomas J. Piacentino, Kennett Square, Pa.

[73] Assignee: Longwood Development Corp., Kennett Square, Pa.

[22] Filed: May 6, 1971

[21] Appl. No.: 140,667

[52] U.S. Cl. .................... 172/116, 172/393, 47/1.1
[51] Int. Cl. ........................ A01b 33/02, A01b 33/12
[58] Field of Search ........ 172/116, 117, 80, 123, 122, 172/387, 393; 47/1.1

[56] References Cited

UNITED STATES PATENTS 1,109,813  9/1914  Aspfors ..................... 172/393
2,805,611  9/1957  Fletchall ................. 172/80 X Primary Examiner—Robert E. Pulfrey
Assistant Examiner—Stephen C. Pellegrino
Attorney—Louis V. Schiavo

[57] ABSTRACT

A compost supported non-dirigible frame of a width for extending across a mushroom bed mounts a shaft and an electric motor and change speed unit operable for actuating the shaft. The shaft mounts a plurality of tines angularly spaced about the shaft and of a length for digging into the compost as they successively present downwardly when the shaft is actuated for working the compost and simultaneously advancing the frame progressively along the mushroom bed.

10 Claims, 6 Drawing Figures

PATENTED DEC 5 1972
3,704,752
SHEET 1 OF 2
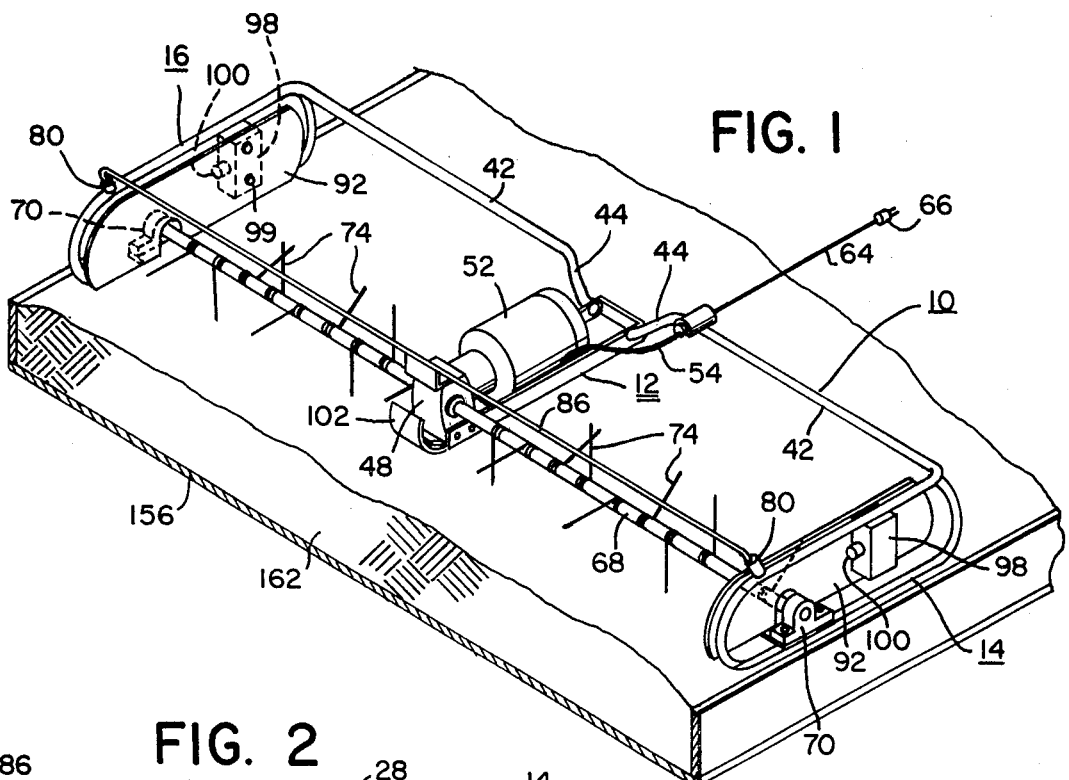
FIG. 1
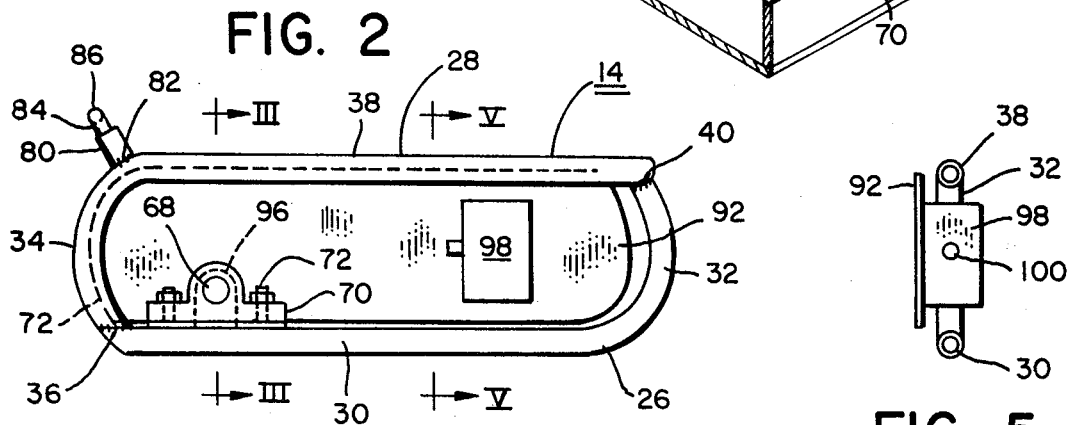
FIG. 2
FIG. 5
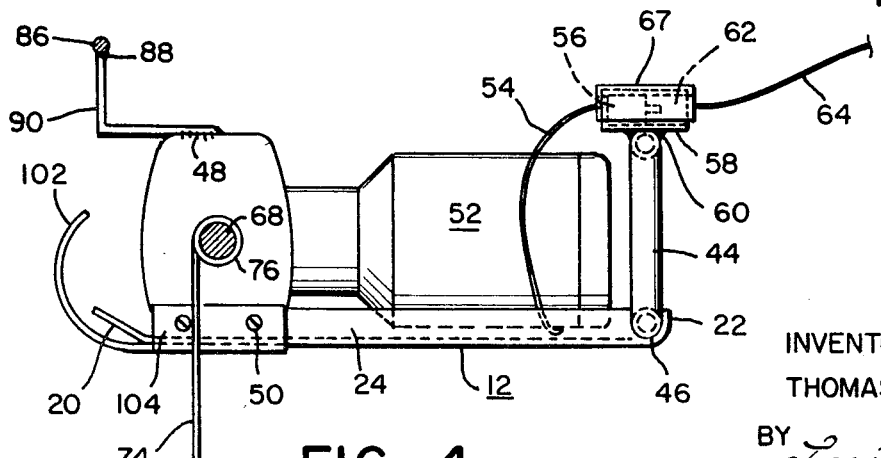
FIG. 4
INVENTOR.
THOMAS J. PIACENTINO
BY *Torris & Schiavo*
ATTORNEY.

INVENTOR.
THOMAS J. PIACENTINO
BY
Torris J Schiavo
ATTORNEY.

APPARATUS FOR WORKING THE COMPOST OF MUSHROOM BEDS

BACKGROUND OF THE INVENTION

1. Field of the Invention

The trays which contain the beds of compost in which mushrooms are grown commercially are commonly arranged in tiers, with six vertically spaced trays to a tier. This invention relates to a power operated machine for working the compost of such beds.

2. Description of the Prior Art

In a commercial mushroom house, the trays of a tier thereof normally are vertically spaced so that only about seven and one-half inches of headroom is provided over a bed of compost. Heretofore, no power operated machine capable of effectively operating in such an environment has been available for working the compost of a mushroom bed.

SUMMARY OF THE INVENTION

A principal object of the invention is to provide a power operated, self-propelled machine for working the compost of a mushroom bed in an environment which provides sharply limited headroom.

Another object of the invention is to provide such a machine which is simple in design, economical to manufacture, comparatively light in weight for easy manual handling, and rugged in use.

BRIEF DESCRIPTION OF THE DRAWINGS

FIG. 1 is a perspective view showing a tray containing a bed of compost and a machine constructed in accordance with the invention extending across the bed in working position;

FIG. 2 is a side view of the machine;

FIG. 4 is a section on line IV—IV in FIG. 3;

FIG. 5 is a section on line V—V in FIG. 2; and

DESCRIPTION OF THE PREFERRED EMBODIMENT

Figure 3:
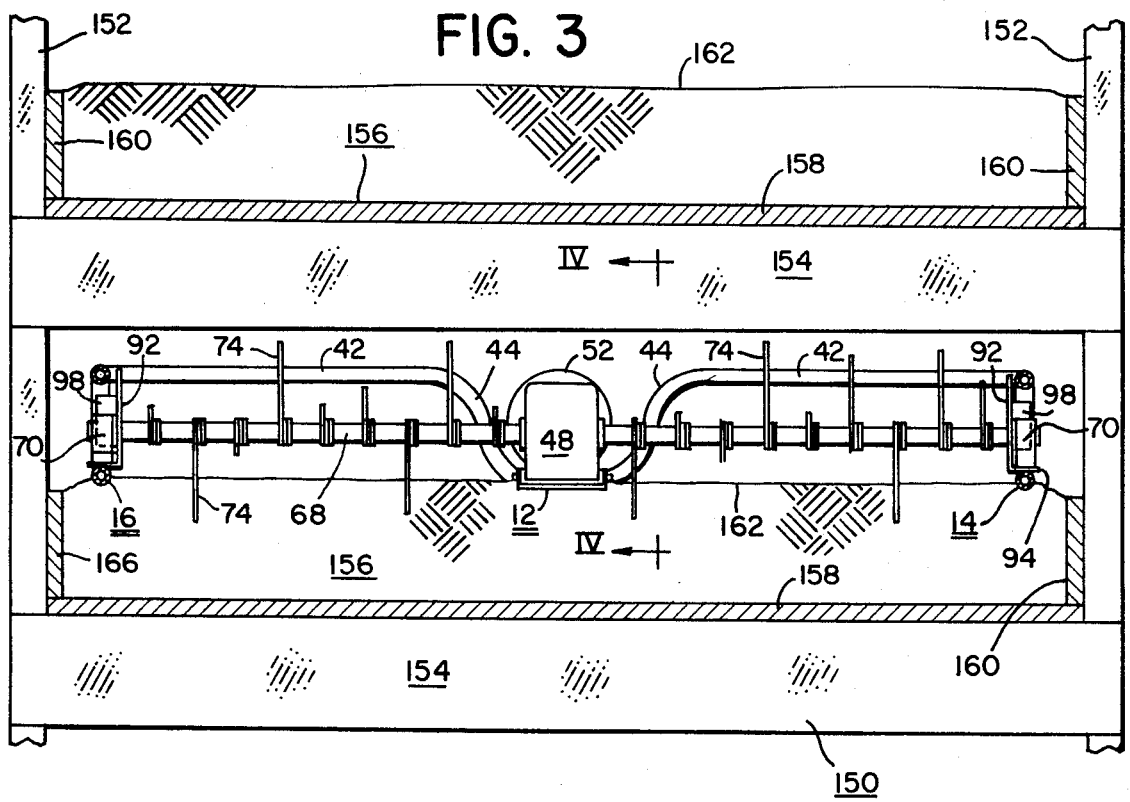
FIG. 3 is a section on line III—III in FIG. 2, but shows the machine extending across a tray of compost in working position.

The following description is directed to the specific embodiment of the invention disclosed in the drawings. It is not addressed to the scope of the invention, which may be practiced in a variety of forms.

Referring particularly to FIG. 1, a machine constructed in accordance with the invention comprises a rigid structural frame, generally designated 10. The frame is provided with three laterally spaced parallel sections 12, 14 and 16 extending lengthwise thereof. The intermediate frame section 12 consists of a horizontally disposed plate member provided with a flange 20 extending upwardly and forwardly at the fore end of the plate member, a flange 22 extending upwardly at the aft end of the plate member, and a pair of flanges 24 extending upwardly respectively on opposite sides of the plate member.

The frame section 14 consists of two tubular members 26 and 28. The member 26 includes a part 30 extending horizontally straight from the fore end of the frame section rearwardly to the aft end of the frame section and there terminating in a part 32 curving upwardly. The member 28 includes a part 34 welded to the part 26 as at 36 and curving upwardly therefrom to the top of the frame section and from there extending rearwardly, as at 38, to the aft end of the frame section, where it is welded to the part 26, as at 40. The part 28 then turns laterally inwardly along the back of the frame, as at 42, and terminates in a part 44 curving downwardly and welded to the plate member 12, as at 46.

It will be understood that the frame section 16 is identical to the frame section 14, except for being constructed to the opposite hand, and as indicated by a cursory examination of the drawings, the frame is very shallow, rather short and comparatively broad. In addition, it will be understood that the plate member 12 and the parts 30 of the tubular members 26 serve as runners, and that the bottoms of these runners are disposed approximately in coplanar relation.

Seated upon the fore end portion of the plate member 12, immediately to the rear of the flange 20 is a change speed unit 48 bolted, as at 50, to the flanges 24. Mounted upon the unit 48 and extending rearwardly therefrom over the plate member 12 is an electric motor 52 from which there extends an electric wire cable 54. A receptacle 56 is connected to the free end of the cable 54 and is inserted into the fore end portion of a tubular sleeve 58 welded to the lateral extension 42 of the member 28, as at 60. A pronged plug 62 connected to one end of an electric wire cable 64 is inserted into the aft end portion of the sleeve 58 for connection with the receptacle 56. A suitable cap 67 is provided to detachably lock the receptacle and plug together. The free end of the cable 64 is provided with a plug 66 for connection to a source of electric power.

Preferably, the electric motor 52 is a one-half horse power, 1,750 r.p.m., 110 volt motor of the totally enclosed, fan cooled type, and the unit 48 is a Boston Gear Box with a 30:1 change speed ratio. The performance of this combination has proved to be excellent.

Coupled to the change speed unit 48 is a shaft 68 extending across the front of the machine. The remote end portions of the shaft are journalled respectively in a pair of bearings 70, each of which is secured by means of a pair of studs 72 to the part 30 of the associated tubular member 26. Axially spaced along the shaft are a plurality of spring wire tines 74. Each tine coils about the shaft as at 76 and then extends generally radially outwardly therefrom a substantial distance. The coiled end portion of the tine is anchored to the shaft as by a bolt (not shown). Eighteen tines in all are mounted on the shaft, nine on each side of the change speed unit 48. It will be understood that the tines are angularly spaced about the axis of the shaft in fan-like fashion for successively presenting in any given direction as the shaft is turned.

Extending upwardly and forwardly respectively from the fore end portions 34 of the tubular members 28 are a pair of short tubular sleeves 80 secured by welds 82. The sleeves 80 respectively receive the opposite end portions 84 of a guard bar 86 extending across the front of the machine. For additional support, an intermediate portion of the bar 86 is welded, as at 88, to a bracket 90 seated on the top of the change speed unit 48.

Mounted upon each of the frame sections 14 and 16 is a guard plate 92 disposed just inside the loop formed by the tubular member 26 and the parts 34 and 38 of the tubular member 28. The plate 92 is of a size and shape corresponding approximately to the size and shape of the loop. A flange 94 at the bottom of the plate 92 is interposed between the tubular member 26 and the bearing 70 and takes the studs 72 to secure the plate 92 in position. The plate 92 is recessed, as at 96, to clear the shaft 68. An electric switch 98 is mounted by bolts 99 on the outer side of the plate 92 for easy access by the operator. The switch 98 is an on-off switch of the type operated by a single push button 100 which is lighted when the switch is closed.

The plate member 12 mounts a nose plate 102, the aft end portion of which is flanged, as at 104, and fitted to the fore end portion of the plate member 12, being secured by bolts 50. The fore end portion of the plate 102 turns upwardly, as shown.

Figure 6:
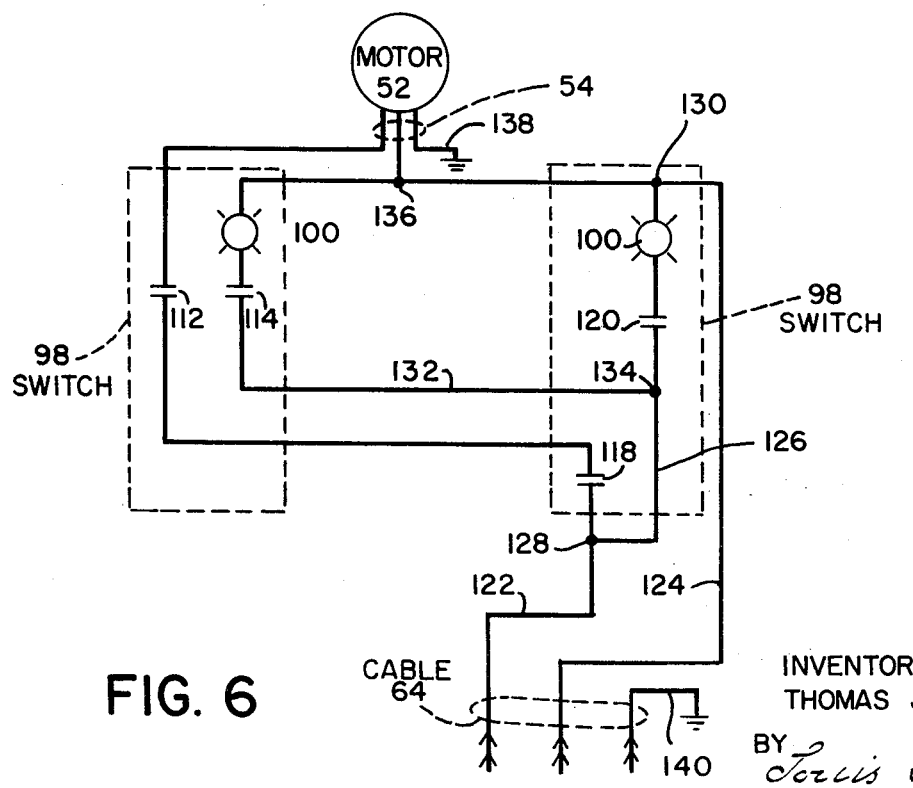
FIG. 6 is a wiring diagram.

Now referring particularly to FIG. 6, which indicates the preferred manner of wiring the machine, the switch 98 on the left comprises two sets of contacts, respectively designated 112 and 114, and the switch on the right comprises two sets of contacts, respectively designated 118 and 120. The cable 64 connected to the source of electric power comprises three leads, as shown. The lead 122 is connected to the motor 52 through the contacts 118 of the switch on the right and the contacts 112 of the switch on the left. The lead 124 is connected directly to the motor 52. The lead 126 is connected, as at 128 and 130, through the contacts 120 and the push button light 100 of the switch on the right, across the leads 122 and 124. The lead 132 is connected, as at 134 and 136, through the contacts 114 and the push button light 100 of the switch on the left, across the leads 124 and 126. The motor is grounded to the frame 10 by the lead 138, and the cable 64 is grounded by the lead 140.

When the push button 100 of the switch 98 is actuated, the contacts of the switch (112 and 114 on the left, and 118 and 120 on the right) if open, close, and if closed, open. When the switch 98 is closed, its push button 100 is energized and lights up to signal that fact. It will be assumed that initially both switches 98 are open, and it will be understood that both switches 98 must be closed in order for the motor 52 to be energized.

When the push button 100 of the switch 98 on the left is actuated, the contacts 112 and 114 close, whereupon the push button is energized and lights up. Since the contacts 118 are open, the motor 52 is not energized. If, instead, the push button 100 of the switch 98 on the right is actuated, the contacts 118 and 120 close, whereupon the push button is energized and lights up. Since the contacts 112 are open, the motor 52 is not energized. When the push buttons 100 of both switches 98 are actuated, the contacts 112, 114, 118 and 120 are all closed. Since the contacts 114 and 120 are closed, the push buttons 100 of both switches 98 are energized and light up, and since the contacts 112 and 118 are closed, the motor 52 is energized. Through the change speed unit 48, the motor 52 actuates the shaft 68, turning it in a counterclockwise direction, as indicated by the arrow in FIG. 3.

A machine constructed in accordance with the present invention is intended for use particularly where trays of mushroom compost are arranged in tiers and vertically spaced close so that very little headroom is provided over a bed of compost.

Referring particularly to FIG. 3, in a commercial mushroom house, the trays are supported on bents, generally designated 150, each comprising a pair of laterally spaced posts 152 and vertically spaced cross members 154. At each level, the cross members 154 carry a tray, generally designated 156, comprising a bottom 158 and sides 160. Each tray is filled with compost 162 to about 1½ inches above the side boards 160 leaving a headroom in the order of 7½ inches between the top of the bed of compost and the lower edge of the cross member 154 supporting the next higher tray 156. A machine constructed in accordance with the present invention performs very satisfactorily in spite of the limited headroom.

The machine is light in weight, as a consequence of which it may be raised by two operators and placed across a mushroom bed, as indicated in FIGS. 1 and 3, at one end of the bed. The cable 64 is plugged into a source of electric power, whereupon the switches 98 are closed by operators stationed in the aisles next to the trays. Thereupon the motor 52, through the change speed unit 48 actuates the shaft 68, which causes the tines 74 to successively present downwardly and thereby dig into the compost. Thus the compost is worked, and at the same time the machine is advanced over the bed of compost. As the machine advances, the cable 64 is played out. The two operators walk along with the machine lending whatever little assistance is needed to assure movement of the machine in a straight line as it advances. If any condition develops which calls for the machine to be shut off, either operator may act to this end by opening the switch 98 on his side. Should it appear to the operators that the headroom over the mushroom bed is insufficient for passage of the machine under a cross member 154, the operators may manually hold the machine back for a bit as it approaches the cross member 154, whereupon the machine will dig farther into the compost and thereby develop sufficient headroom.

While in accordance with the patent statutes, I have illustrated and described the best form of the embodiment of my invention now known to me, it will be apparent to those skilled in the art that changes may be made in the form of the machine described without departing from the spirit and scope of the invention as set forth in the appended claims, and that in some cases certain features of my invention may be used to advantage without a corresponding use of other features. It will be understood that the shaft means may extend in one continuous length through the change speed unit, or may be in two sections coupled respectively to opposite sides of the change speed unit. In addition, it will be understood that the frame sections 14 and 16 may be constructed of one continuous length of tubular material, instead of several.

What is claimed is:

1. In a power operated machine for working the compost of mushroom beds arranged in vertically spaced relation, the combination comprising A. a compost supported non-dirigible frame of a width for extending across a mushroom bed including three laterally spaced parallel frame sections extending lengthwise of said frame and having means extending across the back of said frame, said frame sections extending forwardly from said means and being secured thereby in relatively fixed relation,
B. an electric motor carried by said frame,
C. a change speed unit mounted upon the intermediate one of said frame sections and disposed forwardly of said electric motor,
D. shaft means coupled directly to said change speed unit and extending across the front of said frame, the remote end portions of said shaft means being carried respectively by the remote ones of said frame sections, and
E. a plurality of tines spaced axially along said shaft means and extending generally radially therefrom, said tines being angularly spaced about the axis of said shaft means and being of a length for digging into said compost as they successively present downwardly when said shaft means is actuated, whereupon said machine is advanced over the surface of said mushroom bed with the bottoms of said frame sections effectively functioning as runners in direct contact with said compost.

2. The combination according to claim 1 wherein each of the remote ones of the frame sections includes looped tubular means, said loops being disposed respectively in laterally spaced vertically disposed parallel planes.

3. The combination according to claim 1 wherein the intermediate one of the frame sections consists of a horizontally disposed plate member.

4. The combination according to claim 1 wherein an on-off switch connected in electric circuit with the motor is mounted upon each of the remote ones of the frame sections for easy access by an operator stationed at the associated side of the machine.

5. The combination according to claim 4 wherein the switches are single push button switches which light up when the electric circuit is closed.

6. The combination according to claim 2 wherein the intermediate one of the frame sections consists of a horizontally disposed plate member, and lateral extensions of the looped tubular means tie into the aft end portion of said plate member to thereby secure said frame sections together in relatively fixed relation.

7. The combination according to claim 6 wherein the fore end of each loop is closed, the section of the loop extending along the bottom thereof rearwardly from the closed fore end is of a length to effectively function as a runner, and the intermediate one of the frame sections also is of a length to effectively function as a runner.

8. The combination according to claim 7 wherein the bottoms of the runners are disposed approximately in coplanar relation.

9. The combination according to claim 8 wherein the lateral extensions of the looped tubular means are disposed a substantial distance above the bottom of the frame and extend inwardly toward each other across the back of the frame and then downwardly respectively on opposite sides of the plate member for connection to the aft end portion thereof, the area between said tubular extensions and over said aft end portion of the plate member being open.

10. The combination according to claim 7 wherein a bearing is disposed within each loop and mounted on the section thereof extending along its bottom rearwardly from the closed fore end, and the remote end portions of the shaft means are journalled respectively in said bearings.

* * * * *